US011248629B2

(12) United States Patent
Ueno

(10) Patent No.: US 11,248,629 B2
(45) Date of Patent: Feb. 15, 2022

(54) CENTRIFUGAL COMPRESSOR

(71) Applicant: IHI Corporation, Koto-ku (JP)

(72) Inventor: Takahiro Ueno, Tokyo (JP)

(73) Assignee: IHI Corporation, Koto-ku (JP)

( * ) Notice: Subject to any disclaimer, the term of this patent is extended or adjusted under 35 U.S.C. 154(b) by 158 days.

(21) Appl. No.: 16/594,418

(22) Filed: Oct. 7, 2019

(65) Prior Publication Data

US 2020/0032817 A1    Jan. 30, 2020

Related U.S. Application Data

(63) Continuation of application No. PCT/JP2018/015443, filed on Apr. 12, 2018.

(30) Foreign Application Priority Data

Apr. 25, 2017  (JP) .............................. JP2017-086556

(51) Int. Cl.
| | |
|---|---|
| *F04D 29/44* | (2006.01) |
| *F04D 29/66* | (2006.01) |
| *F02B 33/40* | (2006.01) |
| *F04D 17/08* | (2006.01) |
| *F04D 29/68* | (2006.01) |

(52) U.S. Cl.
CPC ............ *F04D 29/667* (2013.01); *F02B 33/40* (2013.01); *F04D 17/08* (2013.01); *F04D 29/685* (2013.01)

(58) Field of Classification Search
CPC ...... F04D 17/08; F04D 17/10; F04D 29/4213; F04D 29/444; F04D 29/667; F04D 29/685; F05D 2250/51
See application file for complete search history.

(56) References Cited

U.S. PATENT DOCUMENTS 5,246,335 A * 9/1993 Mitsubori ........... F04D 29/4213
                                                    415/214.1
5,399,064 A * 3/1995 Church ............... F04D 29/4213
                                                    415/119

(Continued)

FOREIGN PATENT DOCUMENTS

| CN | 1542289 A | 11/2004 |
|---|---|---|
| CN | 105026769 A | 11/2015 |

(Continued)

OTHER PUBLICATIONS

Combined Chinese Office Action and Search Report dated Jun. 2, 2020, in Patent Application No. 201880024578.7 (with English translation), 13 pages.

(Continued)

*Primary Examiner* — Ninh H. Nguyen
(74) *Attorney, Agent, or Firm* — Oblon, McClelland, Maier & Neustadt, L.L.P.

(57) ABSTRACT

A centrifugal compressor includes: an impeller (compressor impeller); a main flow passage, which has the impeller arranged therein, and extends in a rotation axis direction of the impeller; an auxiliary flow passage formed on a radially outer side of the impeller with respect to the main flow passage; an upstream communication passage configured to allow the auxiliary flow passage and the main flow passage to communicate to each other; a downstream communication passage configured to allow the auxiliary flow passage and the main flow passage to communicate to each other on a side closer to the impeller with respect to the upstream communication passage; and a partition portion (rib or fin) configured to partition the auxiliary passage in a circumferential direction while maintaining a gap larger than a flow passage width of the downstream communication passage in the auxiliary flow passage.

4 Claims, 5 Drawing Sheets

(56) References Cited

U.S. PATENT DOCUMENTS

| | | | |
|---|---|---|---|
| 5,863,178 A * | 1/1999 | Scheinert | ............ F04D 27/0246 |
| | | | 415/58.4 |
| 9,581,173 B2 * | 2/2017 | Moss | ........................ F01D 1/06 |
| 2012/0121400 A1 | 5/2012 | Tomita et al. | |
| 2015/0337863 A1 | 11/2015 | Tomita et al. | |
| 2016/0017791 A1 | 1/2016 | Nakao | |

FOREIGN PATENT DOCUMENTS

| | | |
|---|---|---|
| JP | 2003-314496 A | 11/2003 |
| JP | 2006-342682 A | 12/2006 |
| JP | 2007-127108 A | 5/2007 |
| JP | 2007-224789 A | 9/2007 |
| JP | 2009-138612 A | 6/2009 |
| JP | 2009-243298 A | 10/2009 |
| JP | 2011-85095 A | 4/2011 |
| JP | 5001806 B2 | 8/2012 |
| JP | 5479021 B2 | 4/2014 |
| JP | WO2014/128939 A1 | 8/2014 |
| JP | 2016-29273 A | 3/2016 |
| JP | 6067095 B2 | 1/2017 |
| WO | WO 2014/128939 A1 | 8/2014 |

OTHER PUBLICATIONS

International Search Report dated Jul. 17, 2018 in PCT/JP2018/015443, filed on Apr. 12, 2018 (with English translation).

* cited by examiner

CENTRIFUGAL COMPRESSOR

CROSS REFERENCE TO RELATED APPLICATIONS

This application is a continuation application of International Application No. PCT/JP2018/015443, filed on Apr. 12, 2018, which claims priority based on Japanese Patent Application No. 2017-086556, filed on Apr. 25, 2017, the entire contents of which are incorporated by reference herein.

BACKGROUND ART

Technical Field

The present disclosure relates to a centrifugal compressor in which an auxiliary flow passage is formed on a radially outer side with respect to a main flow passage.

Related Art

In a centrifugal compressor, there is a case in which an auxiliary flow passage is formed on a radially outer side of a main flow passage. A compressor impeller is arranged in the main flow passage. The main flow passage and the auxiliary flow passage communicate to each other through an upstream communication passage and a downstream communication passage. In a region with a small flow rate, high-pressure air having been compressed by the compressor impeller reversely flows through the downstream communication passage and the auxiliary flow passage to return from the upstream communication passage to the main flow passage. With this, a flow rate on appearance increases, and hence an operation region on a small-flow-rate side is expanded.

In a centrifugal compressor described in Patent Literature 1, a partition portion is provided in an auxiliary flow passage. The partition portion extends in a rotation axis direction of a compressor impeller. The partition portion partitions the auxiliary flow passage in a circumferential direction. Air which reversely flows through the auxiliary flow passage turns in a rotation direction of the compressor impeller. With the partition portion, a circumferential velocity component of the air is suppressed. As a result, the pressure on an intake side of the compressor impeller is increased, and hence an operation region on a small-flow-rate side is further expanded.

CITATION LIST

Patent Literature

Patent Literature 1: Japanese Patent No. 5479021

SUMMARY

Technical Problem

When the auxiliary flow passage is partitioned in the circumferential direction as described in Patent Literature 1, there is a risk in that noise is more liable to occur on the small-flow-rate side.

An object of the present disclosure is to provide a centrifugal compressor capable of suppressing noise in a region with a small flow rate.

Solution to Problem

In order to solve the above-mentioned problem, according to one embodiment of the present disclosure, there is provided a centrifugal compressor, including: an impeller; a main flow passage in which the impeller is arranged, the main flow passage extending in a rotation axis direction of the impeller; an auxiliary flow passage formed on a radially outer side of the impeller with respect to the main flow passage; an upstream communication passage configured to allow the auxiliary flow passage and the main flow passage to communicate to each other; a downstream communication passage configured to allow the auxiliary flow passage and the main flow passage to communicate to each other on a side closer to the impeller with respect to the upstream communication passage; and a partition portion configured to partition the auxiliary passage in a circumferential direction while maintaining a gap larger than a flow passage width of the downstream communication passage in the auxiliary flow passage.

At least part of the gap may be located on the downstream communication passage side with respect to a center of the auxiliary flow passage in the rotation axis direction.

A length of the gap in the rotation axis direction may be more than or equal to 40% of a length of the auxiliary flow passage in the rotation axis direction.

The partition portion may include a first partition portion provided on the downstream communication passage side and a second partition portion provided on the upstream communication passage side with the gap with respect to the first partition portion.

the downstream communication passage may be opened between a plurality of first partition portions separated apart from each other in the circumferential direction.

Effects of Disclosure

According to the present disclosure, the centrifugal compressor is capable of suppressing noise in the region with the small flow rate.

DESCRIPTION OF EMBODIMENT

Figure 1:
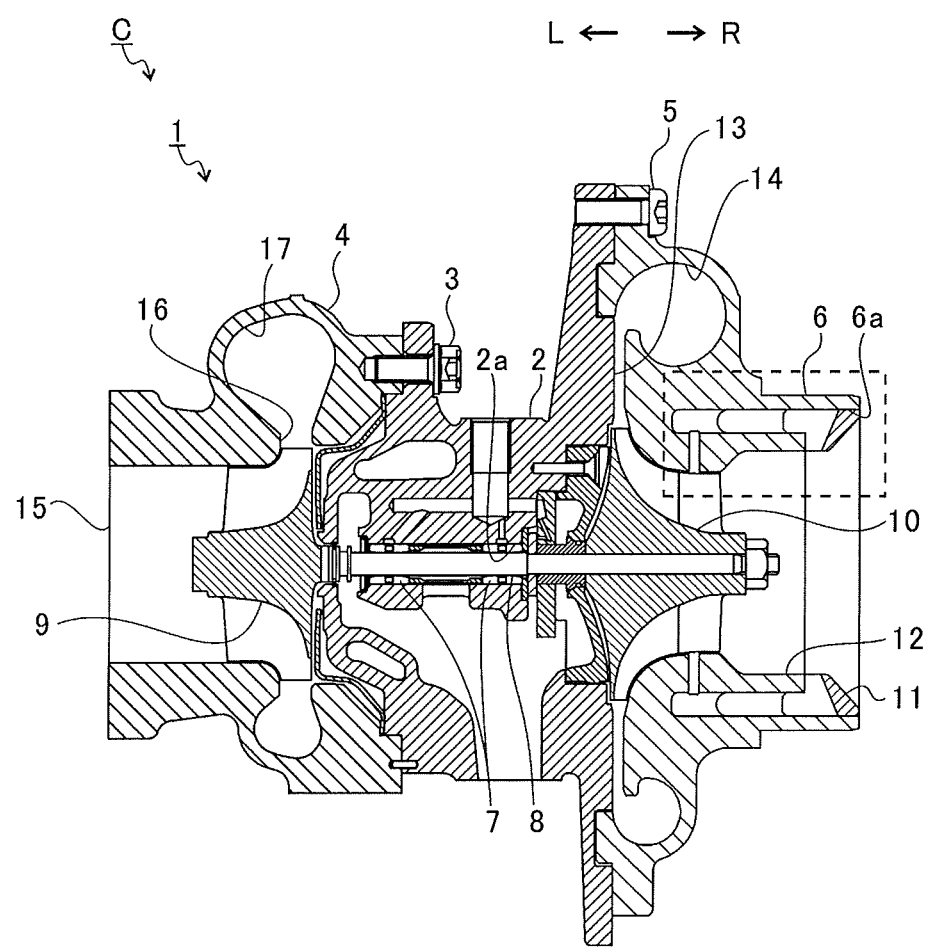
FIG. 1 is a schematic sectional view of a turbocharger.

Now, with reference to the attached drawings, an embodiment of the present disclosure is described in detail. The dimensions, materials, and other specific numerical values represented in the embodiment are merely examples used for facilitating understanding, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a turbocharger C. In the following description, the direction indicated by the arrow L illustrated in FIG. 1 corresponds to a left side of the turbocharger C, and the direction indicated by the arrow R illustrated in FIG. 1 corresponds to a right side of the turbocharger C. In the turbocharger C, a compressor impeller (impeller) side described later functions as a centrifugal compressor. In the following, description is made of the turbocharger C as one example of the centrifugal compressor. However, the centrifugal compressor is not limited to the turbocharger C. The centrifugal compressor may be incorporated into a device other than the turbocharger C, or may be solely provided.

As illustrated in FIG. 1, the turbocharger C includes a turbocharger main body 1. The turbocharger main body 1 includes a bearing housing 2. A turbine housing 4 is coupled to the left side of the bearing housing 2 with a fastening bolt 3. A compressor housing 6 is coupled to the right side of the bearing housing 2 with a fastening bolt 5.

The bearing housing 2 has a bearing hole 2a. The bearing hole 2a passes through the turbocharger C in a right-and-left direction. Bearings 7 are provided in the bearing hole 2a. In FIG. 1, full-floating bearings are illustrated as one example of the bearings 7. However, the bearings 7 may be other radial bearings such as semi-floating bearings or rolling bearings. A shaft 8 is axially supported by the bearings 7 so as to be freely rotatable. A turbine impeller is provided at a left end portion of the shaft 8. The turbine impeller 9 is accommodated in the turbine housing 4 so as to be freely rotatable. Moreover, the compressor impeller 10 is provided at a right end portion of the shaft 8. The compressor impeller 10 is accommodated in the compressor housing 6 so as to be freely rotatable.

The compressor housing 6 has a housing hole 6a. The housing hole 6a is opened on the right side of the turbocharger C. A mounting member 11 is arranged in the housing hole 6a. A main flow passage 12 is defined by the compressor housing 6 and the mounting member 11. The main flow passage 12 is opened on the right side of the turbocharger C. The main flow passage 12 extends in a rotation axis direction of the compressor impeller 10 (hereinafter simply referred to as "rotation axis direction"). The main flow passage 12 is connected to an air cleaner (not shown). The compressor impeller 10 is arranged in the main flow passage 12.

As described above, under a state in which the bearing housing 2 and the compressor housing 6 are coupled to each other with the fastening bolt 5, a diffuser flow passage 13 is formed. The diffuser flow passage 13 is defined by opposed surfaces of the bearing housing 2 and the compressor housing 6. The diffuser flow passage 13 increases the air in pressure. The diffuser flow passage 13 is annularly formed so as to extend from a radially inner side to a radially outer side of the shaft 8. The diffuser flow passage 13 communicates to the main flow passage 12 on the radially inner side described above.

Further, a compressor scroll flow passage 14 is provided to the compressor housing 6. The compressor scroll flow passage 14 has an annular shape. The compressor scroll flow passage 14 is positioned, for example, on the radially outer side of the shaft 8 with respect to the diffuser flow passage 13. The compressor scroll flow passage 14 communicates to an intake port of an engine (not shown). The compressor scroll flow passage 14 communicates also with the diffuser flow passage 13. Rotation of the compressor impeller 10 causes air to be taken into the compressor housing 6 from the main flow passage 12. The air having been taken is pressurized and accelerated in a course of flowing through blades of the compressor impeller 10. The air having been pressurized and accelerated is increased in pressure in the diffuser flow passage 13 and the compressor scroll flow passage 14. The air having been increased in pressure is introduced to the intake port of the engine.

The turbine housing 4 has a discharge port 15. The discharge port 15 is opened on the left side of the turbocharger C. The discharge port 15 is connected to an exhaust gas purification device (not shown). Moreover, a flow passage 16 and a turbine scroll flow passage 17 are provided in the turbine housing 4. The turbine scroll flow passage 17 has an annular shape. The turbine scroll flow passage 17 is located, for example, on an outer side with respect to the flow passage 16 in a radial direction of the turbine impeller 9. The turbine scroll flow passage 17 communicates to a gas inflow port (not shown). Exhaust gas to be discharged from a discharge manifold (not shown) of the engine is introduced to the gas inflow port. The gas inflow port communicates also to the flow passage 16 described above. The exhaust gas having been introduced from the gas inflow port to the turbine scroll flow passage 17 is introduced to the discharge port 15 through the flow passage 16 and blades of the turbine impeller 9. The exhaust gas having been introduced to the discharge port 15 causes the turbine impeller 9 to rotate in a course of flow.

A rotation force of the turbine impeller 9 described above is transmitted to the compressor impeller 10 via the shaft 8. In the manner described above, the air is increased in pressure by the rotation force of the compressor impeller 10 and is introduced to the intake port of the engine.

Figure 2:
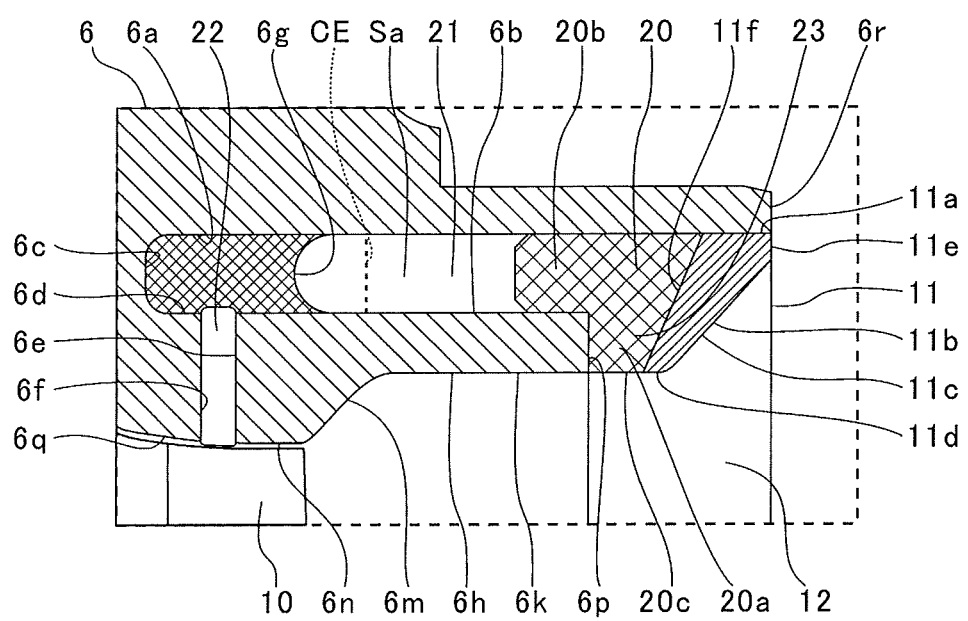
FIG. 2 is an extraction view for illustrating a broken-line portion of FIG. 1.

FIG. 2 is an extraction view for illustrating a broken-line portion of FIG. 1. As illustrated in FIG. 2, a division wall portion 6b is formed in the housing hole 6a. The division wall portion 6b has an annular shape. The division wall portion 6b extends in the rotation axis direction. The division wall portion 6b is separated apart from an inner peripheral surface of the housing hole 6a toward a radially inner side. The inner peripheral surface of the housing hole 6a and an outer peripheral surface of the division wall portion 6b are parallel to the rotation axis direction. However, the inner peripheral surface of the housing hole 6a and the outer peripheral surface of the division wall portion 6b may be inclined with respect to the rotation axis direction, or may be non-parallel to each other.

A projection portion 6d is formed on a bottom surface 6c of the housing hole 6a. The projection portion 6d has an annular shape. The projection portion 6d extends in the rotation axis direction. The projection portion 6d is separated apart from the inner peripheral surface of the housing hole 6a toward the radially inner side. An outer peripheral surface of the projection portion 6d is parallel to the rotation axis direction. However, the outer peripheral surface of the projection portion 6d may be inclined with respect to the rotation axis direction.

The outer peripheral surface of the division wall portion 6b and the outer peripheral surface of the projection portion 6d are flush with each other. However, an outer diameter of the division wall portion 6b may be larger than or smaller than an outer diameter of the projection portion 6d. An end surface 6e of the division wall portion 6b, which is located on the left side in FIG. 2 (projection portion 6d side), and an end surface 6f of the projection portion 6d, which is located on the right side in FIG. 2 (division wall portion 6b side) are separated apart from each other in the rotation axis direction. A slit (downstream communication passage 22 described later) is defined between the end surface 6e of the division wall portion 6b and the end surface 6f of the projection portion 6d.

Ribs 6g (first partition portion) are formed in the housing hole 6a. A plurality of ribs 6g are arranged apart from each other in a circumferential direction of the division wall portion 6b (rotation direction of the compressor impeller 10). In FIG. 2, for ease of understanding, the ribs 6g are indicated by cross hatching. The ribs 6g are formed integrally with the bottom surface 6c of the housing hole 6a. The ribs 6g project from the bottom surface 6c toward the right side in FIG. 2 (fin side described later). The ribs 6g are formed integrally also with the inner peripheral surface of the housing hole 6a and the outer peripheral surface of the division wall portion 6b. That is, the division wall portion 6b is formed integrally with the compressor housing 6. The division wall portion 6b is retained by the ribs 6g while maintaining a gap with respect to the housing hole 6a. However, the division wall portion 6b may be formed separately from the compressor housing 6 to be mounted to the compressor housing 6.

The division wall portion 6b has a division wall hole 6h. The division wall hole 6h passes through the division wall portion 6b in the rotation axis direction. The division wall hole 6h has a large-diameter portion 6k, a radially contracted portion 6m, and a small-diameter portion 6n. The large-diameter portion 6k is opened in an end surface 6p of the division wall portion 6b on the right side in FIG. 2 (side opposite to the projection portion 6d). The radially contracted portion 6m continues to the large-diameter portion 6k on the left side in FIG. 2 (projection portion 6d side). The radially contracted portion 6m is reduced in inner diameter toward the left side in FIG. 2 (projection portion 6d side). An inner diameter of the small-diameter portion 6n is smaller than an inner diameter of the large-diameter portion 6k. The small-diameter portion 6n continues to the radially contracted portion 6m on the left side in FIG. 2 (projection portion 6d side). In the foregoing, description is made of the case in which the large-diameter portion 6k, the radially contracted portion 6m, and the small-diameter portion 6n are formed. However, the shapes thereof are not particularly limited as long as the division wall hole 6h is formed.

The compressor housing 6 has a projection hole 6q. The projection hole 6q passes through the projection portion 6d in the rotation axis direction. The projection hole 6q is opposed to the division wall hole 6h. A part of the compressor impeller 10 is arranged in the projection hole 6q and the division wall hole 6h. An inner peripheral surface of the projection hole 6q conforms to an outer shape of the compressor impeller 10. The projection hole 6q is reduced in inner diameter toward the right side in FIG. 2 (division wall hole 6h side). The division wall hole 6h and the projection hole 6q define a part of the main flow passage 12 described above.

The housing hole 6a is opened in an end surface 6r of the compressor housing 6 on the right side in FIG. 2 (side opposite to the turbine impeller 9). As described above, the mounting member 11 is arranged in the housing hole 6a. A main body portion 11a of the mounting member 11 has, for example, an annular shape. The main body portion 11a is not limited to the annular shape, and may be, for example, cut out at a part thereof in the circumferential direction.

The main body portion 11a is, for example, press-fitted to the housing hole 6a. In such a manner, the mounting member 11 is mounted to the compressor housing 6. However, the mounting member 11 may be mounted to the compressor housing 6 with a fastening member such as a bolt. The mounting member 11 may be joined to the compressor housing 6.

The main body portion 11a has a mounting hole 11b. The mounting hole 11b passes through the main body portion 11a in the rotation axis direction. The mounting hole 11b continues to the division wall hole 6h in the rotation axis direction. The mounting hole 11b has a radially contracted portion 11c and a parallel portion 11d. The radially contracted portion 11c is reduced in inner diameter toward the left side in FIG. 2 (compressor impeller 10 side). The parallel portion 11d is located on the left side in FIG. 2 (compressor impeller 10 side) with respect to the radially contracted portion 11c. An inner diameter of the parallel portion 11d is substantially constant along the rotation axis direction. An inner diameter of the parallel portion 11d of the mounting hole 11b is substantially equal to an inner diameter of the large-diameter portion 6k of the division wall hole 6h. In the foregoing, description is made of the case in which the radially contracted portion 11c and the parallel portion 11d are formed. However, the shapes thereof are not particularly limited as long as the mounting hole 11b is formed.

The mounting hole 11b is opened in an end surface 11e of the mounting member 11. The end surface 6r of the compressor housing 6 and the end surface 11e of the mounting member 11 are, for example, flush with each other. However, the end surface 6r of the compressor housing 6 may be located on the left side in FIG. 2 (compressor impeller 10 side) with respect to the end surface 11e of the mounting member 11. That is, the mounting member 11 may project toward the right side in FIG. 2 (side away from the compressor impeller 10) from the housing hole 6a. Moreover, the end surface 11e of the mounting member 11 may be located on the left side in FIG. 2 (compressor impeller 10 side) with respect to the end surface 6r of the compressor housing 6.

An end surface 11f of the main body portion 11a of the mounting member 11, which is located on the left side in FIG. 2 (compressor impeller 10 side), is a tapered surface. The end surface 11f is located on the left side in FIG. 2 (compressor impeller 10 side) as extending toward the radially inner side. The end surface 11f of the mounting member 11 and the end surface 6p of the division wall portion 6b are separated apart from each other in the rotation axis direction. A part of the end surface 11f on the radially inner side is opposed to the end surface 6p of the division wall portion 6b in the rotation axis direction. The end surface 6p of the division wall portion 6b and the end surface 11f of the mounting member 11 form a gap (upstream communication passage 23 described later) defined therebetween.

Fins 20 (second partition portion) are formed on the end surface 11f. A plurality of fins 20 are arranged apart from each other in the circumferential direction of the main body portion 11a (rotation direction of the compressor impeller 10). In FIG. 2, for ease of understanding, the fins 20 are indicated by cross hatching which is less dense than the cross hatching indicating the ribs 6g. The fins 20 are, for example, formed integrally with the mounting member 11. However, the fins 20 may be formed separately from the mounting member 11 to be mounted to the mounting member 11.

The fins 20 each include an inner peripheral portion 20a and an outer peripheral portion 20b. The outer peripheral portion 20b is located on the radially outer side with respect to the inner peripheral portion 20a. The inner peripheral portion 20a continues to the outer peripheral portion 20b in the radial direction. The inner peripheral portion 20a is a part of the fin 20, which faces the end surface 6p of the division wall portion 6b. The inner peripheral portion 20a extends from the end surface 11f to the end surface 6p of the division wall portion 6b. An inner peripheral end 20c of the inner peripheral portion 20a is substantially flush with the inner peripheral surface of the parallel portion 11d of the mounting member 11 and the inner peripheral surface of the large-diameter portion 6k of the division wall portion 6b. However, the inner peripheral end 20c of the inner peripheral portion 20a may be located on the radially outer side with respect to the inner peripheral surface of the parallel portion 11d of the mounting member 11 and the inner peripheral surface of the large-diameter portion 6k of the division wall portion 6b. The outer peripheral portion 20b extends toward the left side in FIG. 2 (compressor impeller 10 side) with respect to the inner peripheral portion 20a. The outer peripheral portion 20b projects to the gap between the outer peripheral surface of the division wall portion 6b and the inner peripheral surface of the housing hole 6a.

The main flow passage 12 includes the mounting hole 11b, the division wall hole 6h, and the projection hole 6q. The auxiliary flow passage 21 is formed on the radially outer side of the main flow passage 12. The auxiliary flow passage includes a gap defined between each of the outer peripheral surface of the projection portion 6d and the outer peripheral surface of the division wall portion 6b and the inner peripheral surface of the housing hole 6a. The auxiliary flow passage 21 annularly extends. The downstream communication passage 22 is defined by the end surface 6e of the division wall portion 6b and the end surface 6f of the projection portion 6d. The upstream communication passage 23 is defined by the end surface 6p of the division wall portion 6b, the end surface 11f of the mounting member 11, and the fins 20 (inner peripheral portions 20a) adjacent to each other in the circumferential direction. Thus, a plurality of upstream communication passages 23 separated apart from each other in the circumferential direction are formed.

The upstream communication passage 23 is configured to allow the main flow passage 12 and the auxiliary flow passage to communicate to each other. The downstream communication passage 22 is configured to allow the main flow passage 12 and the auxiliary flow passage 21 to communicate to each other on the left side in FIG. 2 (compressor impeller 10 side or downstream side in a flow direction of the main flow passage 12) with respect to the upstream communication passage 23.

The ribs 6g are provided on the downstream communication passage 22 side in the auxiliary flow passage 21. The downstream communication passage 22 is opened between the plurality of ribs 6g separated apart from each other in the circumferential direction. An end portion of the downstream communication passage 22 on the radially outer side is opened between the plurality of ribs 6g. The downstream communication passage 22 is opposed to the compressor impeller 10. An end portion of the downstream communication passage 22 on the radially inner side is opened in the inner peripheral surface of the compressor housing 6, which is opposed to the compressor impeller 10 in the radial direction.

The downstream communication passage 22 extends, for example, in parallel with the radial direction. However, the downstream communication passage 22 may be inclined with respect to the radial direction. The downstream communication passage 22 may be inclined so as to be oriented toward the right side in FIG. 2 (upstream communication passage 23 side) as extending toward the radially outer side. The downstream communication passage 22 may be inclined so as to be oriented toward the left side in FIG. 2 (side opposite to the upstream communication passage 23) as extending toward the radially outer side.

The fins 20 are provided on the upstream communication passage 23 side in the auxiliary flow passage 21. The outer peripheral portion 20b of the fin 20 is located in the auxiliary flow passage 21. The inner peripheral portion 20a is located in the upstream communication passage 23.

The auxiliary flow passage 21 is partitioned by the ribs 6g and the fins 20 in the circumferential direction. Specifically, in the regions in which the ribs 6g and the fins 20 are arranged, the auxiliary flow passage 21 is divided into a plurality of flow passages which are separated apart from each other in the circumferential direction.

The fins 20 are arranged with a gap Sa in the rotation axis direction with respect to the ribs 6g. That is, the fins 20 and the ribs 6g are separated apart from each other in the rotation axis direction. The fins 20 and the ribs 6g are configured to partition the auxiliary flow passage 21 in the circumferential direction while maintaining the gap Sa in the auxiliary flow passage 21.

The gap Sa between the fins 20 and the ribs 6g is longer than a flow passage width of the downstream communication passage 22. The flow passage width of the downstream communication passage 22 is, for example, a width in the rotation axis direction. When the downstream communication passage 22 is inclined with respect to the radial direction, or a width varies depending on a position in the radial direction, for example, a minimum width in a cross section including a rotation axis is defined as the flow passage width of the downstream communication passage 22. That is, a minimum distance between the end surface 6e of the division wall portion 6b and the end surface 6f of the projection portion 6d may be considered as the flow passage width (flow passage throat) of the downstream communication passage 22. In this embodiment, a distance between the end surface 6e of the division wall portion 6b and the end surface 6f of the projection portion 6d is constant. Thus, the gap Sa between the fins 20 and the ribs 6g is larger than a maximum flow passage width of the downstream communication passage 22. Moreover, for example, there is also a case in which a radial position with the minimum flow passage width in the cross section including the rotation axis is different in the circumferential direction. In this case, a value of the flow passage width which is obtained by weight-averaging in consideration of the difference in the radial position may be considered as the flow passage width of the downstream communication passage 22.

Figure 3:
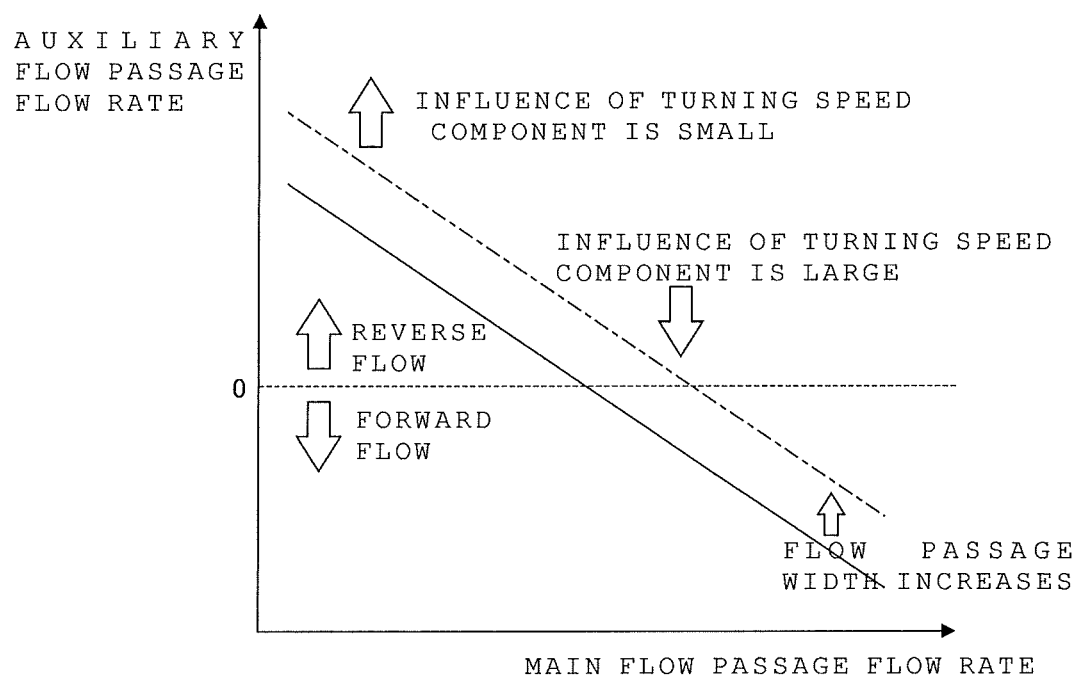
FIG. 3 is an explanatory graph for showing a relationship between a flow rate in a main flow passage and a flow rate in an auxiliary flow passage.

FIG. 3 is an explanatory graph for showing a relationship between a flow rate in the main flow passage 12 and a flow rate in the auxiliary flow passage 21. As shown in FIG. 3, in a region with a large flow rate in the main flow passage 12, the air forwardly flows in the auxiliary flow passage 21 (air flows in the same direction as the flow of the main flow passage 12, and air flows from the upstream communication passage 23 side toward the downstream communication passage side). As the flow rate is larger in the main flow passage 12, the flow rate of the forward flow in the auxiliary flow passage 21 is larger.

In a region with a small flow rate in the main flow passage 12, high-pressure air having been compressed in the compressor impeller 10 reversely flows in the auxiliary flow passage 21 (air flows in a reverse direction with respect to the flow direction of the main flow passage 12, and air flows from the downstream communication passage 22 side toward the upstream communication passage 23 side). As the flow rate is smaller in the main flow passage 12, the flow rate of the reverse flow in the auxiliary flow passage 21 is larger. The air having reversely flowed in the auxiliary flow passage 21 returns from the upstream communication passage 23 to the main flow passage 12. With this, the flow rate on appearance increases, and hence the operation region on the small-flow-rate side is expanded.

The air which reversely flows from the downstream communication passage 22 to the auxiliary flow passage 21 is influenced by the rotation of the compressor impeller 10 to become a turning flow. The turning flow is a flow in the same direction as the rotation direction of the compressor impeller 10. When the auxiliary flow passage 21 is partitioned by the ribs 6g and the fins 20, a circumferential velocity component of the air returning from the upstream communication passage 23 to the main flow passage 12 is suppressed. As a result, the pressure on the intake side of the compressor impeller 10 is increased, and hence the operation region on the small-flow-rate side is further expanded.

As the flow rate of the air reversely flowing from the downstream communication passage 22 to the auxiliary flow passage 21 is larger (as the flow rate in the main flow passage 12 is smaller), the reversely flowing air is higher in flow speed in the rotation axis direction. As a result, as the flow rate of the reversely flowing air is larger, the influence of the circumferential velocity component on the flow direction is smaller. Meanwhile, as the flow rate of the air reversely flowing from the downstream communication passage 22 to the auxiliary flow passage 21 is smaller, the reversely flowing air is lower in flow speed in the rotation axis direction. As a result, as the flow rate of the reversely flowing air is smaller, the influence of the circumferential velocity component on the flow direction is larger.

When the gap Sa between the fins 20 and the ribs 6g is increased, the turning flow of the air is not interrupted in the air gap Sa. Thus, the action of suppressing the circumferential velocity component of the air is reduced. Therefore, in the region with a small flow rate of the reversely flowing air, the reversely flowing air returns to the main flow passage 12 while the circumferential velocity component remains to some extent by the gap Sa. As a result, a flow angle of the air flowing into the blades (fins) of the compressor impeller 10 (relative inflow angle of air with respect to the rotating compressor impeller 10) becomes smaller.

Figure 4:
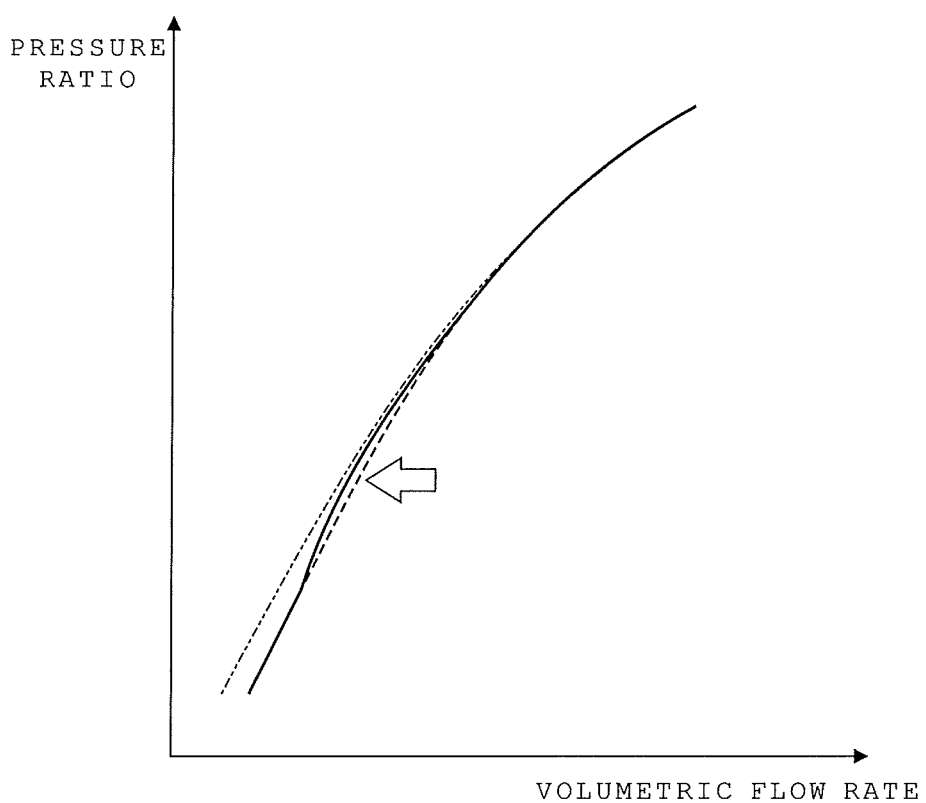
FIG. 4 is an explanatory graph for showing an influence of a length of a gap between fins and ribs.

FIG. 4 is an explanatory graph for showing an influence of a length of the gap Sa between the fins 20 and the ribs 6g. In FIG. 4, the horizontal axis represents a volumetric flow rate. In FIG. 4, the vertical axis represents a pressure ratio. The pressure ratio is a value obtained by dividing a pressure of discharged air by a pressure of intake air.

In FIG. 4, the solid line and the broken line are each a line obtained by connecting peaks of the pressure ratio. The peaks of the pressure ratio are points at which the pressure ratio is the highest when the flow rate is changed under a condition with a constant rotation speed of the shaft 8. The peaks of the pressure ratio which are plotted for each of predetermined rotation speeds of the shaft 8 are connected to form the solid line and the broken line. The solid line represents the case of the configuration of this embodiment. The broken line represents a case of a configuration of a comparative example in which the gap Sa between the fins 20 and the ribs 6g is substantially not provided. The two-dot chain line represents an operation limit for both the configuration of this embodiment and the configuration of the comparative example. Moreover, in FIG. 4, the solid line and the broken line each represent peaks of the pressure ratio under an operation condition with higher rotation speed of the shaft 8 on the upper right side.

In this embodiment, as compared to the comparative example, the gap Sa between the fins 20 and the ribs 6g is longer. As described above, the reversely flowing air returns to the main flow passage 12 while the circumferential velocity component remains by the gap Sa. The flow angle of the air flowing into the blades (fins) of the compressor impeller 10 becomes smaller. That is, air is more likely to flow along the compressor impeller 10. Therefore, the flow rate at which the stall of the compressor impeller 10 occurs becomes smaller, or the flow rate reaches the operation limit without occurrence of the stall of the compressor impeller 10. As indicated by the outlined arrow in FIG. 4, in the region with a small flow rate of the reversely flowing air, the peaks of the pressure ratio are closer to the small-flow-rate side in the embodiment indicated by the solid line as compared to the comparative example indicated by the broken line. Due to the pressure flow rate characteristics of the centrifugal compressor, fluctuation in pressure is larger and noise is more liable to occur on the small-flow-rate side with respect to the peaks of the pressure ratio. In this embodiment, the peaks of the pressure ratio are shifted toward the small-flow-rate side. Accordingly, the stable operation region is expanded, and the noise is suppressed.

Moreover, as described above, as the flow rate of the air reversely flowing from the downstream communication passage 22 to the auxiliary flow passage 21 is larger, the flow speed of the reversely flowing air in the rotation axis direction is higher. The influence of the circumferential velocity component on the flow direction of the reversely flowing air is smaller. Therefore, as indicated by the two-dot chain line in FIG. 4, there is substantially no difference in operation limit between the configuration of this embodiment and the configuration of the comparative example. As can be seen, in this embodiment, the noise can be suppressed substantially without changes in operation limit with respect to the comparative example.

Moreover, as indicated by the one-dot chain line in FIG. 3, in a case in which the flow rate in the main flow passage 12 is the same, when the flow passage width of the downstream communication passage 22 is set larger, the flow rate of the reversely flowing air increases. The influence of the circumferential velocity component on the flow direction of the reversely flowing air becomes smaller. As can be seen, the flow rate of the air reversely flowing in the auxiliary flow passage 21 is correlated to the flow passage width of the downstream communication passage 22. In this embodiment, the gap Sa between the fins 20 and the ribs 6g is set longer (wider) than the flow passage width of the downstream communication passage 22. As a result, the noise can be suppressed. It is assumed that, for example, the gap Sa becomes narrower, and the fins 20 and the ribs 6g are located closest to each other in the axial direction. Moreover, for convenience of description, it is assumed that angle phases in the circumferential direction of installation are the same. The air passing through the gap Sa is significantly accelerated. The speed in the circumferential direction is dependent on an outer diameter of the flow passage, and hence the speed in the rotation axis direction as well as the speed in the circumferential direction are increased. In this case, the influence of the circumferential velocity component of the reversely flowing air is maintained, and the peaks of the pressure ratio are shifted toward the small-flow-rate side. However, there is a risk of causing deterioration of the operation limit. In contrast, the flow of the reversely flowing air passes through the downstream communication passage 22 and thereafter flows into the gap Sa between the fins 20 and the ribs 6g. Therefore, when the gap Sa is wider than the flow passage width of the flow passage width of the downstream communication passage 22, increase in the speed component in the circumferential direction due to the narrowness of the gap Sa is suppressed. As a result, the peaks of the pressure ratio can be shifted toward the small-flow-rate side with stability and without deterioration in operation limit.

Moreover, as illustrated in FIG. 2, at least part of the gap Sa between the fins 20 and the ribs 6g is located on the downstream communication passage 22 side (compressor impeller 10 side) with respect to a center CE of the auxiliary flow passage 21 in the rotation axis direction. One end of the auxiliary flow passage 21 in the rotation axis direction corresponds to, for example, the bottom surface 6c, and the other end is located, for example, on the radially outer side of the end surface 6p of the division wall portion 6b. The center CE of the auxiliary flow passage 21 is located on the right side in FIG. 2 (fin 20 side or mounting member 11 side) with the ribs 6g as a reference. Therefore, the air having flowed from the downstream communication passage 22 into the auxiliary flow passage 21 is more likely to arrive at the gap Sa before losing the circumferential velocity component. As a result, the circumferential velocity component becomes more likely to remain on the small-flow-rate side, and hence the effect of suppressing the noise is improved. The entire region of the gap Sa between the fins 20 and the ribs 6g may be located on the upstream communication passage 23 side (mounting member 11 side) with respect to the center CE of the auxiliary flow passage 21 in the rotation axis direction.

It is assumed that the length of the auxiliary flow passage 21 in the rotation axis direction corresponds to a length from the bottom surface 6c of the housing hole 6a to the end surface 6p of the division wall portion 6b in the rotation axis direction. In this case, the length of the gap Sa between the fins 20 and the ribs 6g in the rotation axis direction is more than or equal to 40% of the length of the auxiliary flow passage 21 in the rotation axis direction. Therefore, as compared to a case in which the length of the gap Sa between the fins 20 and the ribs 6g in the rotation axis direction is less than 40% of the length of the auxiliary flow passage 21 in the rotation axis direction, the effect of suppressing the noise is improved.

Moreover, as described above, the downstream communication passage 22 is opened between the plurality of ribs 6g separated apart from each other in the circumferential direction. The action of suppressing the circumferential velocity component with the ribs 6g is significant. Therefore, when the gap Sa between the fins 20 and the ribs 6g is set larger than the flow passage width of the downstream communication passage 22, the action of suppressing the circumferential velocity component is liable to be reduced. However, it is not always required that the downstream communication passage 22 be opened between the plurality of ribs 6g separated apart from each other in the circumferential direction. The ribs 6g may be formed only on the upstream communication passage 23 side with respect to the downstream communication passage 22.

Figure 5:
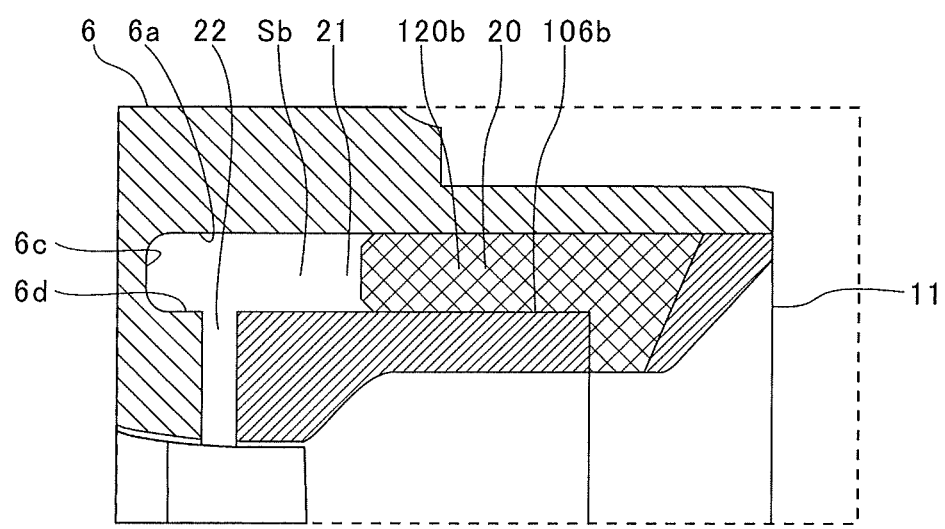
FIG. 5 is an explanatory view for illustrating a modification example.

FIG. 5 is an explanatory view for illustrating a modification example. In FIG. 5, illustration is given of parts corresponding to FIG. 2 in the modification example. In the above-mentioned embodiment, description is made of the case in which the division wall portion 6b is formed integrally with the compressor housing 6 through intermediation of the ribs 6g. As illustrated in FIG. 5, the ribs 6g are not provided in the modification example. The fins 20 are formed integrally with an outer peripheral surface of a division wall portion 106b. That is, the division wall portion 106b is formed integrally with the mounting member 11. However, the division wall portion 106b may be formed separately from the mounting member 11 to be mounted to the mounting member 11.

The division wall portion 106b has a configuration which is substantially the same as that of the division wall portion 6b except that the division wall portion 106b is mounted to the mounting member 11 through intermediation of the fins 20. With regard to the division wall portion 106b, description overlapping with the description of the division wall portion 6b is omitted.

Outer peripheral surfaces 120b of the fins 20 extend toward the projection portion 6d side longer than the outer peripheral portion 20b of the above-mentioned embodiment.

The fins 20 are configured to partition the auxiliary flow passage 21 in the circumferential direction while maintaining a gap Sb, which is longer than the flow passage width of the downstream communication passage 22, in the auxiliary flow passage 21. In the modification example, the gap Sb is defined between the outer peripheral portion 120b of the fin 20 and the bottom surface 6c of the housing hole 6a.

One embodiment of the present disclosure has been described above with reference to the attached drawings, but, needless to say, the present disclosure is not limited to the embodiment. It is apparent that those skilled in the art may arrive at various alternations and modifications within the scope of claims, and those examples are construed as naturally falling within the technical scope of the present disclosure.

For example, in the above-mentioned embodiment, description is made of the case in which both the fins 20 and the ribs 6g are provided. Moreover, in the modification example, description is made of the case in which the ribs 6g are not provided but the fins 20 are provided. However, the ribs 6g may be provided without the fins 20 being provided.

INDUSTRIAL APPLICABILITY

The present disclosure can be used for a centrifugal compressor having an auxiliary flow passage formed on a radially outer side with respect to a main flow passage.

What is claimed is:

1. A centrifugal compressor, comprising: an impeller; a main flow passage in which the impeller is arranged, the main flow passage extending in a rotation axis direction of the impeller; an auxiliary flow passage formed on a radially outer side of the impeller with respect to the main flow passage; an upstream communication passage configured to allow the auxiliary flow passage and the main flow passage to communicate to each other; a downstream communication passage configured to allow the auxiliary flow passage and the main flow passage to communicate to each other on a side closer to the impeller with respect to the upstream communication passage; and a partition portion configured to partition the auxiliary flow passage into a plurality of flow passages separated apart from each other in a circumferential direction, wherein the partition portion includes: a first partition portion comprising a plurality of ribs extending in the rotational axis direction of the impeller provided on a downstream communication passage side, and a second partition portion comprising a plurality of fins extending in the rotational axis direction of the impeller provided on an upstream communication passage side; the plurality of fins are separated from the plurality of ribs by a gap larger than a flow passage width of the downstream communication passage with respect to the first partition portion, and wherein the downstream communication passage is opened between a plurality of the first partition portions separated apart from each other in the circumferential direction.

2. The centrifugal compressor according to claim 1, wherein at least part of the gap is located on the downstream communication passage side with respect to a center of the auxiliary flow passage in the rotation axis direction.

3. The centrifugal compressor according to claim 1, wherein a length of the gap in the rotation axis direction is more than or equal to 40% of a length of the auxiliary flow passage in the rotation axis direction.

4. The centrifugal compressor according to claim 2, wherein a length of the gap in the rotation axis direction is more than or equal to 40% of a length of the auxiliary flow passage in the rotation axis direction.

\* \* \* \* \*